(12) United States Patent
Kalita (10) Patent No.: US 10,246,595 B2
(45) Date of Patent: Apr. 2, 2019

(54) COMBINATORIAL MATERIALS ARCHITECTURE AND PROCESS FOR TEXTILES AND RELATED APPLICATIONS

(71) Applicant: Parash Kalita, Springdale, AR (US)

(72) Inventor: Parash Kalita, Springdale, AR (US)

(73) Assignee: NanoMech, Inc., Springdale, AR (US)

( * ) Notice: Subject to any disclaimer, the term of this patent is extended or adjusted under 35 U.S.C. 154(b) by 224 days.

(21) Appl. No.: 14/609,345

(22) Filed: Jan. 29, 2015

(65) Prior Publication Data

US 2015/0210865 A1 Jul. 30, 2015

Related U.S. Application Data

(60) Provisional application No. 61/932,954, filed on Jan. 29, 2014.

(51) Int. Cl.
*C09D 5/18* (2006.01)
*C09K 21/04* (2006.01)
*C09K 21/12* (2006.01)
*C09D 5/14* (2006.01)
(Continued)

(52) U.S. Cl.
CPC .................. *C09D 5/18* (2013.01); *C09D 5/14* (2013.01); *C09D 5/38* (2013.01); *C09D 7/67* (2018.01); *C09K 21/04* (2013.01); *C09K 21/12* (2013.01); *Y10T 428/256* (2015.01)

(58) Field of Classification Search
CPC ............................ C08K 5/0066; C08K 3/0058
See application file for complete search history.

(56) References Cited

U.S. PATENT DOCUMENTS 5,011,602 A 4/1991 Totani et al.
5,089,298 A 2/1992 McNally et al.
(Continued)

FOREIGN PATENT DOCUMENTS

EP 0440482 A1 * 8/1991 ............ D06M 13/52
WO WO 2012049886 A1 * 4/2012 ............. B32B 27/18
(Continued)

OTHER PUBLICATIONS

"Silver as an Antimicrobial Agent," microbewiki.kenyon.edu/index.php/Silver_as_an_Antimocrobial_Agent (downloaded on Jan. 20, 2015).
(Continued)

*Primary Examiner* — Alexandre F Ferre (57) ABSTRACT

A multifunctional material composition functioning as a halogen-free flame-retardant finish combined with in certain implementations one or both of antimicrobial and insect-repellant is nanomanufactured by the absorption/adsorption of metallic salts with one or more additional compounds by inorganic crystallites. The identity of the additional compounds is determined by the desired functionality of the substrate. The material composition can be chemically and mechanically applied to substrates (e.g. to cotton, nylon, and polyester based textile fabrics), for example, to yield durable antimicrobial, insecticidal, and environmentally friendly flame retardant materials. The addition of nano-scale metallic deposits to a phosphorous-rich and nitrogen-rich architecture complex improves the flame retardant properties of the substrates.

18 Claims, 4 Drawing Sheets

(51) Int. Cl.
*C09D 5/38* (2006.01)
*C09D 7/40* (2018.01)

(56) References Cited

U.S. PATENT DOCUMENTS

| | | | |
|---|---|---|---|
| 5,213,783 A * | 5/1993 | Fukumura | C01B 25/405 423/305 |
| 5,503,918 A | 4/1996 | Samson et al. | |
| 6,346,574 B1 * | 2/2002 | Nishihara | C08L 25/06 525/132 |
| 8,183,167 B1 | 5/2012 | Delattre et al. | |
| 2007/0009563 A1 | 1/2007 | Hataipitisuk | |
| 2008/0157915 A1 | 7/2008 | Lin | |
| 2009/0088495 A1 * | 4/2009 | Mikami | C08K 3/0058 523/205 |
| 2010/0119720 A1 | 5/2010 | Vestergaard Frandsen et al. | |
| 2012/0196953 A1 | 8/2012 | Ziolkowski et al. | |

FOREIGN PATENT DOCUMENTS

| | | | |
|---|---|---|---|
| WO | WO 2012059944 A2 * | 5/2012 | ............ A01N 59/16 |
| WO | 2012161603 A2 | 11/2012 | |

OTHER PUBLICATIONS

"Puretex Natural Silver Anti-bacterial Technology," hhltechnology.org/puretex (downloaded on Jan. 20, 2015).

"Why 'Anti-Odor' Clothes Stink," Organic Gardening, organicgardening.com/living/why-anti-odor-clothes-stink (downloaded on Jan. 20, 2015).

"Copper: An Antimicrobial Super-Material?," qmed.com/mpmn/medtechpulse/copper-antimicrobial-super-material (downloaded on Jan. 20, 2015).

"Cupron develops Anti-microbial and skin care technology based on copper," www.cupron.com (downloaded on Jan. 20, 2015).

* cited by examiner

COMBINATORIAL MATERIALS ARCHITECTURE AND PROCESS FOR TEXTILES AND RELATED APPLICATIONS

CROSS-REFERENCE TO RELATED APPLICATIONS

This application claims the benefit of U.S. provisional patent application No. 61/932,954, filed Jan. 29, 2014, for "Multifunctional Finish Treatment for Textiles." Such application is incorporated herein by reference in its entirety.

BACKGROUND

The present invention relates to an engineered combinatorial material architecture across length scale hierarchy for multifunctional treatment of synthetic, semi-synthetic, and non-synthetic (natural) substrates. The functional attributes of the nanoengineered material architecture may be flame retardant or in combination with antimicrobial and/or insect repellent, and/or hydrophobic properties.

The use of flame-retardant treatment processing of various synthetic, semi-synthetic, and natural-made industrial products such as textiles is common, as safety standards and concerns have required certain materials to be capable of inhibiting, suppressing, or delaying the production of flames. Halogen-based materials, for example, are known, but raise significant toxicity concerns. Antimicrobial treatment products including silver have become popular in order, for example, to control odor. An improved multifunctional, combinatorial material architecture for treatment processing of various substrates that provides one or more of these functions, with improved properties, is desirable.

BRIEF SUMMARY

The present invention is directed in certain embodiments to a nanoengineered combinatorial material architecture consisting of organic-inorganic-metallic complexes that may, in certain embodiments, comprise micro-scale inorganic crystallites, surface activated by metallic and/or pyrethroid complexes in a composite architectural complex to improve the function of the substrate treatment. The metallic and/or pyrethroid deposits size may vary from micro to nano range and be of random shapes within the complex. In various implementations, this nanoengineered composite serves as a multifunctional treatment for substrates capable of serving antimicrobial, insecticidal, and environmentally friendly flame-resistance functions. In various implementations, the composition may yield a multifunctional treatment capable of flame resistance combined with either or both antimicrobial and insect-repellent functions. The material may be produced through a nanomanufacturing process. The use of metallic deposits as part of the composite material complex boosts the thermal properties/behavior of the material, thereby improving its fire-retardant properties. Depending upon the metal chosen in various implementations, the material may also exhibit antimicrobial (bacterial and fungus resistance) functions. The multifunctional treatment is capable of being used on synthetics, semi synthetics and non-synthetic substrates. One example may be textile fabrics such as cotton, nylon, polyester, or a blend of cotton-synthetics.

In various implementations, the chemical architecture of the nanoengineered solid-phase composition consists of sub-micro inorganic crystallites surface activated by depositing a metallic deposit(s) and/or permethrin on the crystallite surface through a chemical nanomanufacturing process. The metallic component may comprise deposits in certain implementations with a diameter range from 5-100 nanometers or alternatively up to micrometers and may be, for example, copper, silver, or copper-silver complex/compound. The inorganic crystallites in various implementations can range in size between 0.2-50 microns or alternatively up to hundreds of microns and may include phosphorous-containing and nitrogen-containing compounds, including but not limited to, Ammonium Polyphospate (APP), Meamine Polyphosphate (MP), Calcium Carbonate ($CaCO_3$), Magnesium Hydroxide, Gypsum, Silicon Dioxide ($SiO_2$), Aluminosilicate Clay, or a combination of more than one type of these or other inorganic materials. The composite may also include deposits of quaternary ammonium compounds for further antimicrobial function. The type of deposit on the inorganic crystallites depends on the desired function of the treatment—whether flame resistant and antimicrobial; flame resistant and insect-repellent; flame resistant-hydrophobic, or flame resistant, antimicrobial, hydrophobic, and insect-repellent. The engineered combinatorial material will be referred to in places as a composite from here onwards.

These and other features, objects and advantages of the present invention will become better understood from a consideration of the following detailed description of the preferred embodiments and appended claims in conjunction with the drawings as described following:

DETAILED DESCRIPTION

Figure 1:
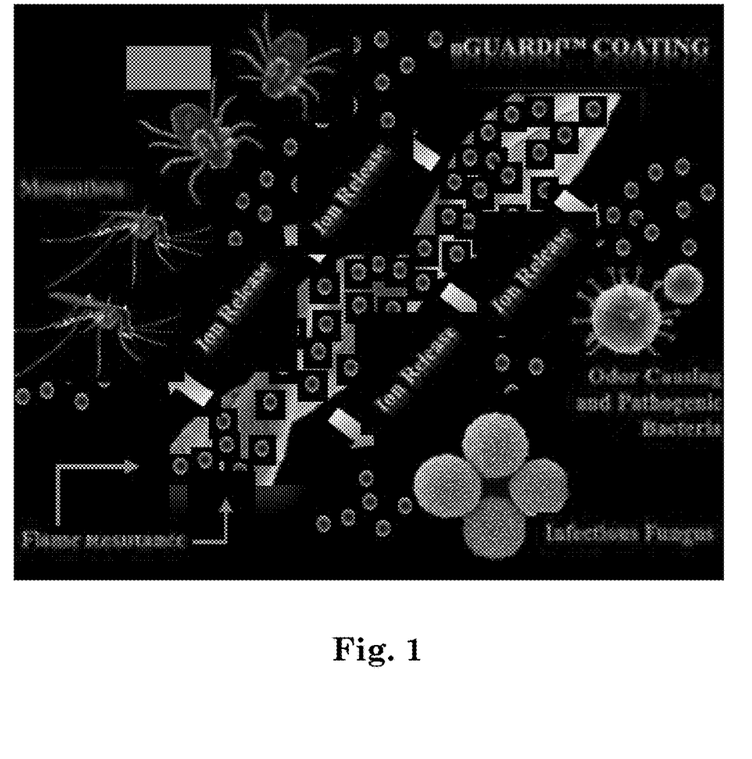
FIG. 1 is an illustration of the functions of one embodiment of the invention, wherein the selected treatment acts as a flame-retardant, insect-repellent, and antimicrobial agent.

With reference to FIG. 1, an illustration of the function of an implementation of the present invention for use as a multifunctional treatment for substrates may be described. A treatment of certain composition, chosen based on the desired function of the treatment, is applied to a substrate. This implementation in this case is a metallic-quaternary ammonium-synthetic permethrin (pyrethroid) deposit composition corresponding to a treatment that functions as a flame-resistant, antimicrobial, and insect-repelling agent. The release of ions, for example copper or silver ions, provides protection against odor-causing and pathogenic bacteria as well as fungus. As further explained below, the metallic portion of the composite architecture also improves flame-retardant properties of the materials, with the permethrin protects against insects such as mosquitoes.

Figure 2:
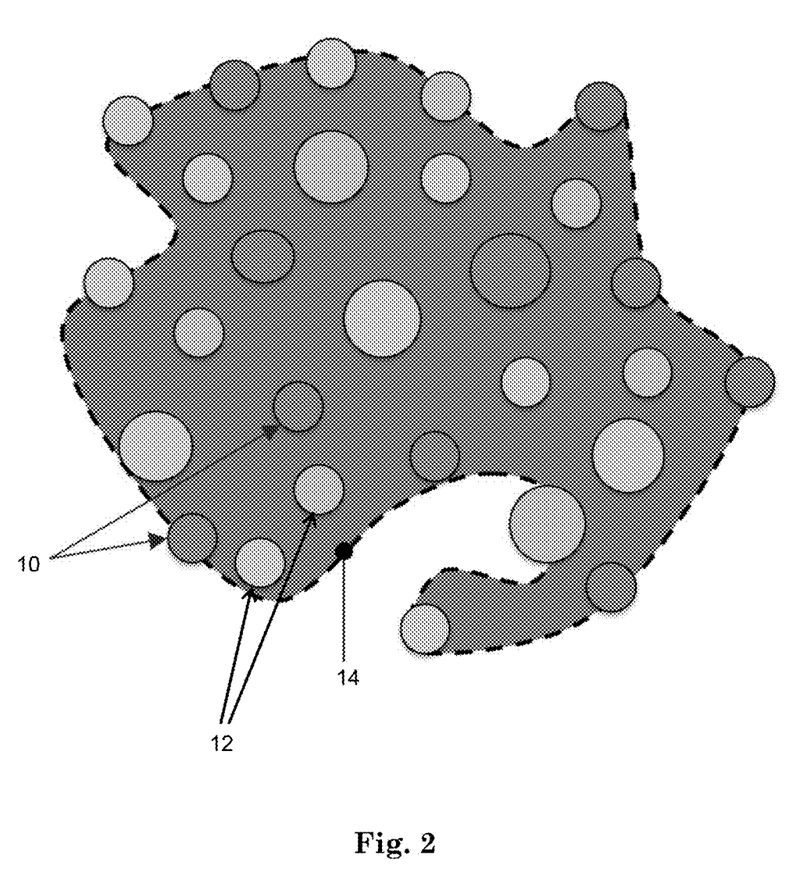
FIG. 2 is a diagram of a composite architecture coating according to one embodiment of the invention.
Figure 3:
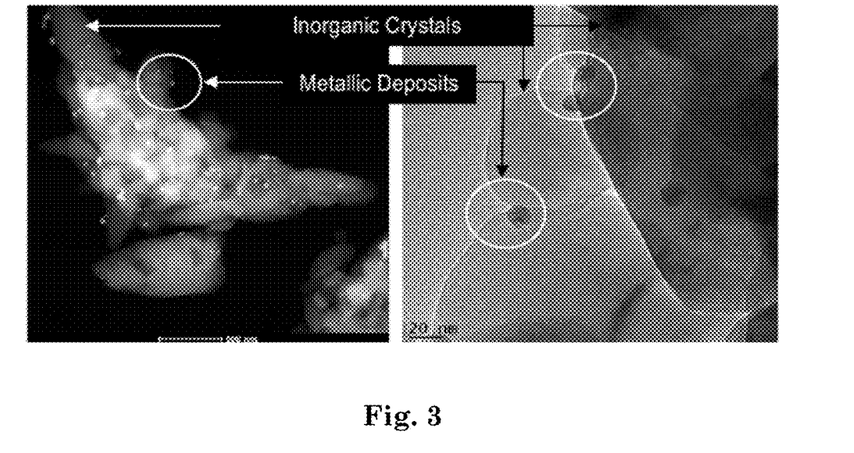
FIG. 3 is two high-resolution transmission electron images at varying resolutions showing a composite architecture according to one embodiment of the invention.

FIG. 2 provides an illustration of a composite architecture of a textile treatment architecture according to certain implementations, while FIG. 3 provides a corresponding representative high-resolution transmitting electron image of one embodiment of the invention, wherein inorganic crystals are formed into a composite architecture with nano-sized metallic deposits. Other embodiments of the invention would, for example, further comprise (in addition to the metallic deposits) either quaternary ammonia deposits, permethrin deposits, or both, depending on the desired function of the treatment. FIG. 2, for example, shows the organic-inorganic complex of materials 14 with permethrin deposits 10, and multiple metallic deposits on the composite (such as copper and silver) at 12. Although the metallic deposits 12 and permethrin deposits 10 are shown as circles in FIG. 2, the invention is not so limited, and these deposits can vary in both size and shape. The micrograph of FIG. 3, showing examples of the combinatorial material architecture at different scales, shows that in fact the metallic deposits within the architecture of the inorganic crystals may be in relatively random positions, different shapes, and different sizes. These deposits may vary within the micro- and nano-range sizes in various implementations.

Candidate materials for the inorganic crystallites in the composite architecture may be, in various embodiments, materials that comprise phosphorous- and nitrogen-rich materials. When exposed to flame, such materials together form a char barrier on the substrates due to decomposition. The char layer insulates the remaining substrate, thereby blocking oxygen from coming into further contact and thus preventing or inhibiting further combustion. Particular candidate materials for the inorganic crystallites in the composite architecture may be, in various implementations, ammonium polyphosphate (APP) long chain and short chain, melamine (M), melamine polyphosphate (MPo), and melamine pyrophosphate (MPy).

In addition, gaseous water-releasing materials may be included in the composite, in certain implementations candidate materials including alumina trihydrate (ATH), magnesium hydroxide ($Mg(OH)_2$), zinc borate, and gypsum. At high temperatures, these materials decompose endothermically to release gaseous-phase water that is chemically combined into the material. The continuous release of gaseous water phase retards the combustion process.

Protecting barrier forming materials may also be included in the composite, candidate materials including calcium carbonate ($CaCO_3$), silicon dioxide ($SiO_2$), Halloysite, Bentonite clay, titanium dioxide ($TiO_2$), and zinc oxide (ZnO). These materials act as inorganic barriers for heat and mass transport during an event of fire, thereby decreasing flammability and improving thermal stability.

In certain implementations, particle sizes for these crystallites including phosphorous- and nitrogen-rich materials, gaseous water-releasing materials, and protective barrier materials may range from 0.2-100 microns.

Metallic deposits may include any metals in various implementations, but in particular certain implementations may include copper, silver, aluminum, nickel, chromium, and cobalt. Copper and silver have antimicrobial (including anti-fungal) properties. The size of the metallic deposits may be greater than 10 nm in certain implementations, or may be in the range of 5-100 nm in certain embodiments.

The presence of the metallic deposits within the architecture improves the flame retardant properties of the material. Experimental results show that a typical treatment of inorganic crystallites including long chain ammonium polyphosphate and melamine polyphosphate will produce a protective char layer at temperatures above 300° C. Because the metallic deposits exhibit high thermal conductivity, the addition of metallic deposits to the composite complex lower the temperature at which the char layer may be formed, thereby further protecting the substrate from combustion. In one experimental set-up, the addition of copper metallic deposits lowered the temperature at which the char layer formed to within the range of 220°-240° C. The surface deposition of the thermally conductive metallic deposit imparts temperature adaptability to the composite. In effect, it reduces the thermal dissociation temperature or decomposition temperature of the inorganic materials to enable the instigation of flame retardant activity at lower-than-usual temperatures. This enables the flame to be retarded more quickly and inhibits the spread of flame before further damage to life or property may occur as a result of combustion of the substrate.

Smaller (i.e., nano-scale) metallic deposits may be more desirable as a flame-retardant addition to the composite architecture because they pick up heat from a flame adjacent to the textile more quickly, and because they exhibit greater surface area for a particular volume or weight of metallic deposit that is employed. The quantity of metallic deposit employed may be particularly significant for certain costly metals, such as silver. The smaller footprint of the metallic deposits yields enhanced thermal activity per unit area of coverage. To expand upon and provide another example to that provided above, a composite employed was composed of APP-MP-Cu, ammonium polyphosphate and melamine polyphosphate yield high content of 'P' (28-30%) and 'N' (53-55%). Under normal circumstances, both APP and MP decompose at temperatures above 300° C. However, due to high thermal conductivity and heat sink properties of copper deposits on APP-MP, the decomposition of the composite is enabled at even lower surrounding temperatures (220-240° C.). In other words, the presence of copper rapidly triggers the flame retardant activity of APP-MP composite for maximum control of the initiation and propagation of flames/fire.

The inorganic-metallic composite architecture describes in various implementations herein can be applied as flame retardant treatment to a variety of consumer substrates and systems, including but not limited to woven and non-woven textiles (nylon, cotton, polyesters, and blends), wood and wood-polymer composite products, polymeric components and systems (including plastics and epoxy), polymeric paints, coatings, and foams, etc.

For flame retardant treatment of textiles, the nanoengineered composite can be augmented with different types of organic resins depending on the type of textile material (nylon, cotton, polyester, synthetic-cellulosic blend, or other synthetics). The composite is compatible for application to finished textiles via back coating as well as different chemical finishing, including but not limited to padding, kiss rolling, foaming, spraying, and exhaustion processes. The composite can also be applied to textiles during yarn processing, weaving, and other stages of textile processing.

The precise process for the application of various implementations of the invention may depend upon the particular type of substrate chosen. For example, in the case of nylon, the composite architecture material applied to the relatively non-absorbent nylon fiber results in a lower melting temperature for the material, in certain embodiments the change being from about 220° C. to about 180° C. As a result, the nylon material may melt, but is prevented from becoming hot enough to actually combust. In a nylon treatment application, materials may include the "core ingredients" of a phosphorous-rich, nitrogen-rich, and metallic deposit previous described, along with thiourea, urea-formaldehyde (as cross-linker for durability), a wetting agent, a pH balancing material, and other catalysts/auxiliaries.

In the case of cotton (cellulosic based textiles), the fiber is absorbent, and thus can absorb the composite architecture material employed. In addition to the core ingredients of the composite containing phosphorous-rich, nitrogen-rich, and metallic deposit previously described, the material may include organophosphorous and carbamide, as well as a wetting agent, a pH balancing material, and other auxiliaries. The result is a treated cotton fiber that is flame resistant.

In the case of polyester, the composite may be supplemented with cyclic phosphate as well as a surfactant and pH balancer.

The invention in various implementations may also be supplemented with materials exhibiting hydrophobic properties in order to add a water resistant property. Such materials may include, for example, fluorocarbons and polytetrafluoroethylene (PTFE) particles. Short-chain (C6) PFC-based fluorocarbons may be used due to safety concerns, and due to the resulting applicable regulations pertaining to the use of fluorocarbons with longer carbon chains. It may be noted that PTFE and C6 fluorocarbons are combustible materials, and thus the flame-retardant aspects of the composite architecture material described herein with one or more of these hydrophobic materials may be particularly advantageous.

In the case of certain metallic deposits, the antimicrobial function is provided by the release of metallic ions with antimicrobial effect. For example, in the presence of water, copper results in the production of Cu II (cupric) ions ($Cu^{2+}$) and silver results in the production of silver ions ($Ag^+$). These ions are effective inhibiting microbes including various types of bacteria as well as various types of fungi. Cupric and silver ions have different efficacy with different microbes, and thus the choice of metallic deposit within the composite architecture may be driven by a desire to defeat a particular microbial agent or agents.

In those embodiments that encompass an insecticidal feature, pyrethroid (synthetic permethrin) in either liquid or solid form may be used in the composite. In certain implementations, particle sizes for these deposits may be greater than 10 nm.

As noted, the size of the metallic deposits in the composite architecture may range from the micro- to nano-scale, but in particular implementations may range from 5-100 nanometers, while the size of the inorganic crystallites may also range from the micro- to the nano-scale, but in particular implementations may range from 0.2-50 microns. The inorganic crystallites are surface activated by depositing the metallic material, the metallic-permethrin complexes, the metallic-ammonium complexes, or the metallic-permethrin-ammonium complexes through a chemical nanomanufacturing process. This nanomanufacturing process involves the absorption/adsorption of solutions of metal salt precursors, optionally quaternary ammonium salts, and permethrin by the solid inorganic crystallites, followed by a chemical reduction process, wherein the metal salts are reduced to their elemental form. This reduction process takes place in the presence of antioxidants and capping agents. The resultant metal-permethrin-inorganic composite paste is heat cured and milled to a desired powder size.

More particularly describing the nanomanufacturing process for the synthesis of the composite, the process involves adsorption and absorption of metal salt solution (precursor of the desired metallic deposits) and/or permethrin by the inorganic microcrystals. Next, chemical reduction of the metallic deposits occurs from the precursor salt inside and on the surface of the inorganic crystals. Controlled thermal consolidation of the composite is followed by powder milling and/or screening. Candidate metal salts may include, in various implementations, metal nitrate, metal chloride, metal sulfate, and metal acetate. Candidate reducing agents may include, in various implementations, hydrazine monohydrate and sodium borohydride. Capping agents may include sodium dodecyl sulfate, ethylene glycol, polyethylene glycol (PEG), polyacrylic acid, and cetyl (trimethyl) ammonium bromide. Antioxidants used may include ascorbic acid and citric acid.

Example 1

This example presents a composite mix of ammonium polyphosphate and melamine polyphosphate with nano-sized deposits of Cu (II) and Ag (I).

In this particular example, to a suitable high-shear mixer with heating capability, a 50-50 mix of ammonium polyphosphate (long chain APP) and melamine polyphosphate powders (93 wt. % of total composite mass) were discharged. Separate water-based solutions containing 3.67% copper nitrate and 1.57% silver nitrate salt solution were added to the powder mix. The content of water was adjusted to form a thick slurry paste with the powders. Mixing continued at a temperature of 140° F. until a thick homogeneous paste was formed after the complete absorption of liquid contents by the powder particles. The mixing is further followed by the addition of a 2.08% hydrazine monohydrate solution containing 1% ascorbic acid and 1% polyethylene glycol. The mixing was continued until the metal salts were chemically reduced to metal nano-sized deposits, marked by a uniform change of color of the paste to dark grey. The resultant composite paste was dried and cured to form solid flakes in a vacuum furnace at a temperature of 150° C. The dried flakes were milled and ground to a fine micronized powder (2.5 μm) using a powder granulator. The final powdered product is a composite of 50-50 mix of ammonium polyphosphate and melamine polyphosphate with nano-sized deposits of 1% Cu (II) and 1% Ag (I) (20 nm or less average particle size). The results of this example are shown in the micrographs of FIG. 3.

Example 2

Figure 4:
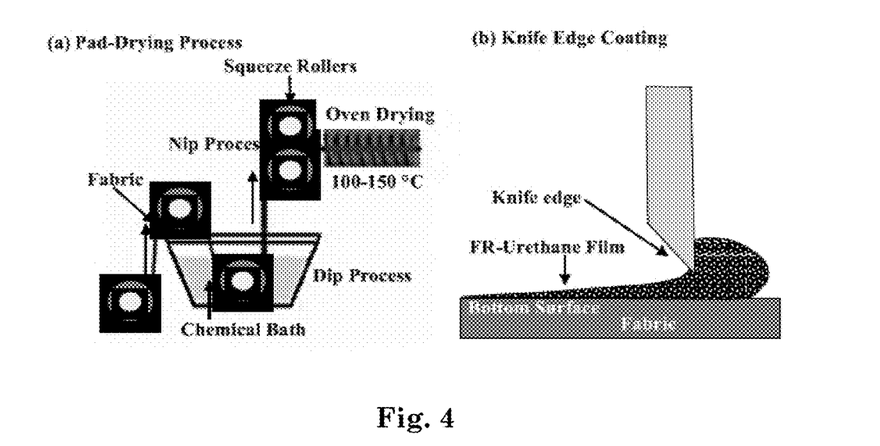
FIG. 4 is an illustration of the pad drying process of textiles and knife edge, a method for treating the textiles with the nanoengineered composite.

With reference to FIG. 4, a process for applying the composite material to a nylon textile fabric previously manufactured may be described. Into a suitable mixing vessel with heating capability, 10 parts Thiourea (as organo-sulfur), 5 parts urea-formaldehyde polymer resin, 1 part formalin (37% concentrate), and 36 parts DI water were added and mixed to a homogeneous solution. The temperature was maintained between 130-140° F. during mixing. This solution was referred to as Resin A. Resin A was transferred to a suitable mixing vessel and to it, 5 parts of the composite of Example 1, 0.25 part of clay-based rheological modifier, 0.25 part of cationic surfactant, and 38.5 parts of DI water were added and mixed at room temperature and thereafter, ultrasonicated until the composite powder particles were uniformly dispersed in the solution. To this solution, 1 part of wetting agent, 1.5 parts of ethylene-vinyl chloride-based binder, and 1.5 parts of methylated melamine cross-linker resin were added and mixed in a high-shear homogenizer. The above-described solution was used for the treatment of 100% nylon fabric samples. The treatment was applied using one dip and one nip pad-cure process as shown in FIG. 4. Curing was performed at temperatures between 360-375° F. With adequate curing, the treated nylon yielded durable flame resistance and greater than 99.99% antimicrobial efficacy without perceptibly altering the hand and color of the nylon fabrics.

Example 3

The following example illustrates treatment for 100% cotton fabric with the composite. Into a suitable mixing vessel with heating capability, 40 parts of Tetrakis (hydroxymethyl) phosphonium sulfate (as Organophosphorus), 10 parts urea (as Carbamide), 5 parts urea-formaldehyde polymer resin, 5 parts cyclic phosphonate, 0.5% non-ionic wetting agent, 0.75% of methylated melamine cross-linker resin and 38.75 parts DI water were added and mixed to a homogeneous solution. The temperature was maintained between 130-140° F. during mixing. This solution was referred to as Resin A. Into a suitable mixing vessel, 5 parts of composite of Example 1, 0.25 part of clay-based rheological modifier, 0.25 part of cationic surfactant, and 91.75 parts of DI water were added and mixed at room temperature and thereafter, ultrasonicated until the composite powder particles were uniformly dispersed in the solution. To this solution, 0.5 part of wetting agent, 1.5 parts of ethylene-vinyl chloride-based binder, and 0.75 parts of methylated melamine cross-linker resin were added and mixed in a high-shear homogenizer. This solution was referred to as Resin B.

Figure 5:
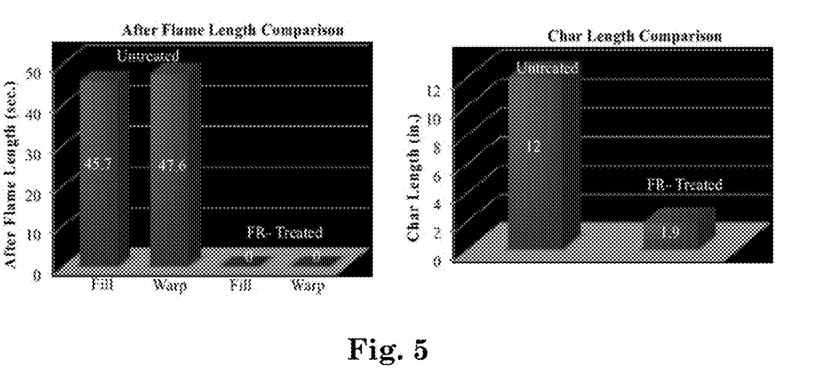
FIG. 5 is a set of bar graphs showing experimental results of an implementation of the invention for treated textiles relative to untreated textiles.

The above-described solutions (Resin A and B) were used for the treatment of 100% cotton fabric samples in two steps. The first processing step used pad application of Resin A and curing at 300-340° F. The second and final treatment processing used pad application of Resin B and curing at 360-375° F. When cured properly, the treated cotton fabrics showed durable flame resistance and greater than 99.99% antimicrobial efficacy without perceptibly altering the hand and color of the fabrics. FIG. 5 shows some of the results from ASTM D6413 vertical flammability tests on treated fabrics in bar graph form.

Example 4

The present invention can also be applied as a combination of chemical treatment (as in Example 2 and 3) and back coating. The following example illustrates a method to finish synthetic fabrics by chemical treatment for antimicrobial and insect-repellent functions and back coating for flame resistance. The chemical treatment used Finish Resin B of Example 2, with 0.5 parts and 0.75 parts of additional non-ionic wetting agent and methylated melamine cross-linker resin, respectively. Chemical treatment involved one dip and one nip padding process, followed by curing at 360-375° F. After curing, FR back coating was applied on the fabrics using a knife-edge coating method, as shown in FIG. 4. Back coating was accomplished in two steps. First step included a back coating of 1 oz. (per ft² of fabric) of cyclic phosphonate (150,000 cps at 68° F.) and then cured at 390-395° F. A second back coating of 0.5 oz. of urethane was applied on top of the cyclic phosphonate coating using the same knife-edge coating method and a curing temperature of 300° F. The fabrics finished with the above methods yielded durable flame resistance and antimicrobial activity.

The present invention has been described with reference to the foregoing specific implementations. These implementations are intended to be exemplary only, and not limiting to the full scope of the present invention. Many variations and modifications are possible in view of the above teachings. The invention is limited only as set forth in the appended claims. All references cited herein are hereby incorporated by reference to the extent not inconsistent with the disclosure herein. Unless explicitly stated otherwise, flows depicted herein do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims. Any disclosure of a range is intended to include a disclosure of all ranges within that range and all individual values within that range.

The invention claimed is:

1. A treated, flame-retardant substrate material complex, the complex consisting essentially of:
   a. a plurality of inorganic crystallites, each having a surface, wherein the plurality of inorganic crystallites comprises at least one of (a) a plurality of phosphorous-containing crystallites and (b) a plurality of nitrogen-containing crystallites; and
   b. a plurality of functional particles deposited on the surface of at least a portion of the plurality of inorganic crystallites, wherein the functional particles comprise a plurality of metallic deposits,
   wherein a portion of the surface of the inorganic crystallites remains uncovered and further wherein a portion of the surface of the inorganic crystallites is in direct contact with another of the inorganic crystallites.

2. The substrate of claim 1, wherein the metallic deposits comprise one or more of copper, silver, aluminum, nickel, chromium, and cobalt.

3. The substrate of claim 2, wherein the metallic deposits comprise one or more of copper and silver.

4. The substrate of claim 3, wherein at least a first subset of the plurality of metallic deposits comprise copper and at least a second subset of the plurality of metallic composites comprise silver.

5. The substrate of claim 4, wherein the phosphorous-containing crystallites and nitrogen-containing crystallites are sized within a range of 0.2-100 microns.

6. The substrate of claim 1, wherein the metallic deposits are within a size range of 5-100 nanometers.

7. The substrate of claim 1, wherein the phosphorous-containing material is one or more of ammonium polyphosphate-long chain, ammonium polyphosphate-short chain, melamine polyphosphate, and melamine pyrophosphate.

8. The substrate of claim 1, wherein application of a flame to the composite architecture will result in the formation of a char layer.

9. The substrate of claim 1, wherein the functional particles further comprise one or more of C6 fluorocarbon and PTFE.

10. The substrate of claim 1, wherein the functional particles further comprise permethrin deposits.

11. The substrate of claim 10, wherein the permethrin deposits are of size greater than 10 nm.

12. The substrate of claim 1, wherein the base substrate comprises synthetic, semi-synthetic, or non-synthetic (natural) materials.

13. A substrate comprising a composite architecture material complex, the composite architecture complex consisting essentially of:
   a. a phosphorous-containing material comprising a plurality of phosphorous-containing micro-crystallites;
   b. a nitrogen-containing material comprising a plurality of nitrogen-containing micro-crystallites; and c. a plurality of nano-scale metallic deposits randomly distributed on the phosphorous-containing micro-crystallites and the nitrogen-containing micro-crystallites, wherein at least some of the phosphorous-containing micro-crystallites and the nitrogen-containing micro-crystallites are in direct contact with each other within the composite architectural material complex.

14. The substrate of claim 13, wherein the nano-scale metallic deposits comprise one or more of copper deposits and silver deposits.

15. The substrate of claim 13, wherein the metallic deposits are between 5 and 100 nm in size.

16. The substrate of claim 15, wherein the metallic deposits are non-uniform in size.

17. The substrate of claim 16, wherein the metallic deposits are non-uniform in shape.

18. The substrate of claim 13, wherein the substrate comprises one or more of cotton, poly-cotton, nylon, cellulose, and a polymer.

\* \* \* \* \*